United States Patent [19]
Kalyon et al.

[11] Patent Number: 5,365,115
[45] Date of Patent: Nov. 15, 1994

[54] METHOD AND APPARATUS FOR MITIGATION OF MAGNETIC FIELDS FROM LOW FREQUENCY MAGNETIC FIELD SOURCES

[75] Inventors: Dilhan M. Kalyon, Teaneck; Halit S. Gokturk, Hoboken; Sudhir B. Railkar, Clifton, all of N.J.

[73] Assignee: Stevens Institute of Technology, Hoboken, N.J.

[21] Appl. No.: 902,071

[22] Filed: Jun. 23, 1992

[51] Int. Cl.$^5$ ............................................. H02G 7/22
[52] U.S. Cl. ........................................ 307/89; 307/91
[58] Field of Search ................ 361/143, 147; 307/91, 307/89, 104; 174/32, 40 R, 35, 35 R

[56] References Cited

U.S. PATENT DOCUMENTS

| | | | |
|---|---|---|---|
| 3,801,877 | 4/1974 | Griese et al. | 317/157.5 |
| 4,646,046 | 2/1987 | Vavrek et al. | 335/301 |
| 4,931,625 | 6/1990 | Marlinski | 219/528 |
| 5,068,543 | 11/1991 | Ohkawa | 307/91 |
| 5,153,378 | 10/1992 | Garvy, Jr. | 174/35 R |

Primary Examiner—A. D. Pellinen
Assistant Examiner—Aditya Krishnan
Attorney, Agent, or Firm—Francis C. Hand

[57] ABSTRACT

A method and apparatus for mitigation of magnetic fields from magnetic field sources operating at low frequencies, typically less than 100 KHZ, are provided. The method is based on placing magnetic bodies of proper shape, size and physical properties close to the source of the magnetic field to cancel or reduce the magnetic field at desired sites, located away from the source. The method is applicable to mitigating all sources of magnetic fields including those generated by electric power lines, transformers, various tools, electronic devices and appliances. The apparatus, an application of the method to electric power transmission lines, consists of body of magnetic material disposed adjacent to at least one conductor of a multi-line electric power transmission system. The body is disposed between the conductors and a right-of-way located along the power transmission lines in order to lie within the magnetic field generated by the power transmission line and to thereby reduce the magnitude of the magnetic filed at and beyond the right-of-way. In one example studied in conjunction with an electric power transmission line in the X-configuration, a reduction of 84% was achieved at the edge of the right-of-way with an arc-shaped magnetic body disposed adjacent to one of the lowermost conductors.

23 Claims, 15 Drawing Sheets

METHOD AND APPARATUS FOR MITIGATION OF MAGNETIC FIELDS FROM LOW FREQUENCY MAGNETIC FIELD SOURCES

This invention relates to a method and apparatus for mitigation of a magnetic field. More particularly, this invention relates to a method for mitigating magnetic fields produced by a magnetic filed generating source such as electric power transmission lines.

BACKGROUND OF THE INVENTION

The physical phenomena pertaining to electricity and magnetism is described by Maxwell's equations, shown below:

$$\nabla \cdot D = \rho$$

$$\nabla \times E = -\partial B/\partial t$$

$$\nabla \cdot B = 0$$

$$\nabla \times H = J + \partial D/\partial t$$

$$D = \epsilon E$$

$$B = \mu H$$

wherein D is the electric displacement, E is the electric field, B is the magnetic flux density, H is the magnetic field, $\rho$ is the charge density, J is the current density, $\epsilon$ is the permittivity and $\mu$ is the magnetic permeability.

Various sources of magnetic fields generally operating at low frequencies are encountered commonly in everyday life. The sources include but are not limited to electric power transmission and distribution lines, transformers, building wiring and such appliances as hair dryers, electrical blankets, video display terminals, electrical ovens, radios and telephones. The magnetic fields generated by such common sources pass through the human body, without significant attenuation since the magnetic permeability of the human body is similar to that of air, i.e. $4\pi \times 10^{-7}$ H/m. The response of living tissue to the magnetic fields passing through is not well understood. While it may take a number of years before scientific studies demonstrate the absence or presence of health effects from low frequency magnetic fields, public concern nevertheless presently exists. In response to this concern, this invention uses shielding to reduce human exposure to these magnetic fields.

In conventional techniques employed to reduce exposure to low frequency, i.e. less than 100 KHz, magnetic fields, the area to be shielded from the magnetic field existing outside is enclosed completely (J. D. Jackson, "Classical Electrodynamics", 2nd edition, John Wiley, NY, 1975, p. 199) or partially by a magnetic material of high relative permeability. Magnetic materials exhibit magnetic permeability values which are significantly greater than the permeability of free space. Such high permeability materials offer a path of low reluctance to the magnetic field lines and shunt the magnetic field lines. Thus, with a magnetic enclosure the magnetic filed magnitude within the enclosure is reduced when the source exists at the outside. However, such mitigation of the magnetic fields by completely enclosing large structures where the magnetic field needs to be reduced, is extremely costly. If it is desired to shield a currentbearing device of small dimensions, the device can again be completely or partially enclosed by a magnetic material of high relative permeability (W. R. Smyth, "Static and Dynamic Electricity", 2nd edition, McGraw-Hill, NY, 1950, p. 288). However, this method is not practical for cases where the source is large in dimensions and extends over long distances, A good example of such a magnetic field source is a high voltage electric power transmission line.

Electromagnetic interference shielding covers for shielding objects, such as radios, from receiving travelling electromagnetic waves are described, for example, in U.S. Pat. No. 4,474,676 and for shielding computer terminals and the like from emitting electromagnetic fields, are described in U.S. Pat. No. 4,785,136.

Accordingly, it is an object of the invention to mitigate the magnetic field of a magnetic field generating source at a minimum of cost.

It is another object of the invention to mitigate the magnetic field of a structure such as an electric power transmission line and a distribution line.

It is another object of the invention to provide a magnetic field mitigation body with an external field which can reduce the field of the source in an extended area that is large as compared to the size of the shield.

Briefly, the invention provides a method and apparatus for mitigating a magnetic field from a magnetic field source.

In accordance with the method, the pattern of a magnetic field generated about a magnetic field generating source is first determined and, thereafter, a body of magnetic material is positioned adjacent to the source in a predetermined area of the magnetic field pattern in a manner to reduce the magnitude of the pattern at an area remote from the source and the body, that is, at the area which is to be protected.

The method is particularly directed to altering the magnetic field generated by a source operating at a low frequency, typically less than 100 KHz, and by using a magnetic body of proper shape, size and physical properties. Thus, the method is also applicable to frequencies other than those used for electric power (50-60 Hz).

The magnetic body may consist of various materials, including pultruded strips of soft magnetic materials, which posses high permeability values, strips or assemblies of such magnetic materials, extruded profiles or molded bodies of magnetic composites consisting of soft magnetic fillers and conductive or non-conductive binders/matrices. The magnetic body used to mitigate the magnetic field generated by a source may be solid, hollow or of mesh design. The shape and size of the magnetic body depend on the magnetic field generated by the source, the physical properties of the magnetic body and the targeted magnetic field at specified locations. The method for the optimization of the size and shape of the magnetic body involves the detailed solution of Maxwell's equations, analytically or by employing numerical techniques. Experimental techniques may also be used for insight and validation of results.

It should be noted that the possibility of the mitigation of the magnetic field at locations far away from a source by placing a magnetic body into the vicinity of the source is not obvious to those skilled in the art. The classical problem of placing a cylinder with an infinite relative permeability into the vicinity of a single current carrying wire (E. Weber, "Electromagnetic Fields", Vol. 1, John Wiley, NY, 1950, p. 240) in the most favorable position of the cylinder touching the wire is an example. Little change in the magnetic field at far-away locations are observed associated with the presence of the cylinder with infinite permeability. If the radius of the cylinder is 5% of the distance of separation between the wire and the location where mitigation is desired, the magnetic field would be reduced to only 95% of the original field due to the presence of this relatively large cylinder.

After the body of magnetic material is placed in the vicinity of the magnetic field source, the body becomes magnetized under the influence of the source field. Then, the field of the magnetic material alters the field of the original source, reducing the field in some regions and enhancing the field at other locations. If the shape, physical properties and the size of the magnetic body are selected carefully, the size of the magnetic body can be kept comparable to the characteristic dimensions of the source and still mitigate the field at distances which are long compared to the characteristic dimension of the magnetic body.

In the case of electronic devices or other sources of magnetic fields, the use of a body of magnetic material close to the source may eliminate the need to completely or partially enclose the source of the magnetic field.

Mitigation of time varying magnetic fields requires a magnetic material which can change its direction of magnetization in response to the applied field. The magnetization of the material must follow the external field with a reasonable degree of efficiency. Such materials are called soft magnetic materials. The magnetic properties of some soft ferromagnetic alloys, which are commercially available, are given below. The magnetic permeability of the material is a measure of how well the material can become magnetized with the application of the external field. The coercive force is the magnetic field at which the magnetic flux density becomes zero. The saturation flux density of the material is the field up to which the material can be used without degradation of its magnetic permeability. High magnetic permeability high saturation flux densities and small coercive forces are desirable for this application.

| TRADE NAME | MAXIMUM MAGNETIC PERMEABILITY | COERCIVE FORCE (OERSTEDS) | SATURATION FLUX DENSITY (KILOGAUSS) |
|---|---|---|---|
| Permalloy* | 200,000 | 0.015 | 8.0 |
| Supermalloy* | 300,000 | 0.004 | 7.8 |
| Metglas 2705M** | 600,000 | 0.015 | 7.7 |
| Metglas 2714A** | 1,000,000 | 0.002 | 5.7 |

*G.Y. Chin and J.H. Wernick, "Soft Magnetic Metallic Materials" in Editor: E.P. Wohlfart, "Ferromagnetic Materials", Vol. 2, Ch. 2, North Holland, NY, 1986, p. 143.
**Metglas Technical Bulletin, Allied Signal Metglas Products, Parsippany, NJ.

The above described method may also be used to increase the magnitude or the components of the magnetic field at targeted locations, if desired.

For field mitigation to be effective, the shape and size of the magnetic body should be properly selected. The size and shape of the magnetic body needs to be determined for each case, where mitigation is desired. The tools include the numerical or analytical solutions of Maxwell's equations or experimental studies.

In one embodiment, the apparatus is employed for an electric power transmission system including electrically conductive lines (i.e. conductors) for conducting electrical current with a corresponding magnetic field being produced transversely of each line. Generally, such a system employs two towers for supporting the conductors in an elevated position along and above a predetermined right-of-way. In accordance with the invention, a body of magnetic material is deployed adjacent to at least one of the lines which acts as a magnetic field generating source. This body is so disposed between the conductor and the right-of-way so as to intercept and distort the magnetic field relative to the right-of-way to an extent to reduce the magnitude of the magnetic field at and beyond the right-of-way.

In this system, the electrically conductive lines conductors may be disposed in a rectangular array or any other suitable array commonly used for electric power transmission lines. In accordance with the invention, the magnetic body is disposed adjacent to one of the lowermost conductors and between the conductor and the right-of-way. However, the body may be located adjacent to one of the other conductors and, also, multiple bodies may be used.

Generally speaking, the body is disposed close to the source of the magnetic field rather than to the object to be protected against the magnetic field.

The magnetic field mitigation body serves to mitigate magnetic fields that exhibit a dipole or multipole nature by using the external field of a soft magnetic material placed in the immediate vicinity of the source. In this respect, the body is not required to enclose the source.

The field of the magnetic body is a dipole field. In this respect, the body does not operate effectively against a source that has a monopole field such as a single current-carrying wire. However, as the order of the source field increases, for example from a monopole to a dipole or from a dipole to a quadrupole, the effectiveness of the body increases.

The body may also be employed in the mitigation of magnetic fields generated by sources other than electric power transmission lines and the like.

The shape and size of the body and the location of the body with respect to the source of the magnetic field are chosen such that the field magnitude will be reduced in certain directions.

In accordance with the invention, the magnetic field of the source magnetizes the soft magnetic body and the external field of the magnetized body opposes that of the source in some directions. The geometry and location of the body with respect to the source can be optimized to yield maximum reduction in the desired regions.

One characteristic of the body is that the external field of the body can reduce the field of the source in an extended area that is large as compared to the size of the body.

The shape of the body is chosen so as to conform to an original magnetic field plot in order to achieve optimum magnetization and maximum dipole moment for a given size. Further, the body may be solid, hollow, in the form of a mesh, laminated in layers and the like.

These and other objects and advantages of the invention will become more apparent from the following detailed description taken in conjunction with the accompany drawings wherein:

FIG. 1 schematically illustrates an electric power transmission system employing two magnetic field mitigating bodies in accordance with the invention;

Figure 3:
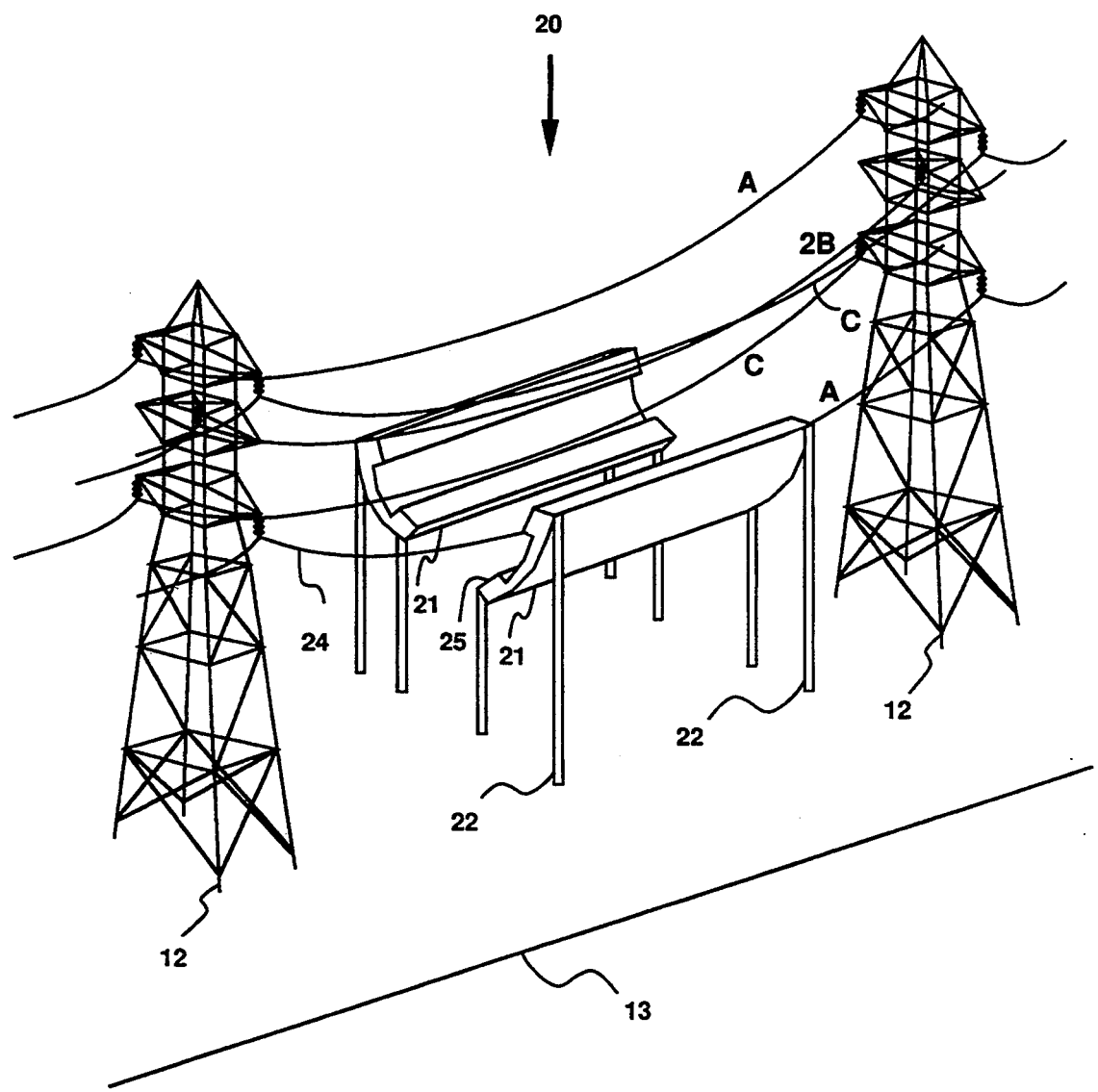
FIG. 3 illustrates another electric power transmission system designated as the X-configuration together with two mitigating magnetic bodies.
Figure 9A:
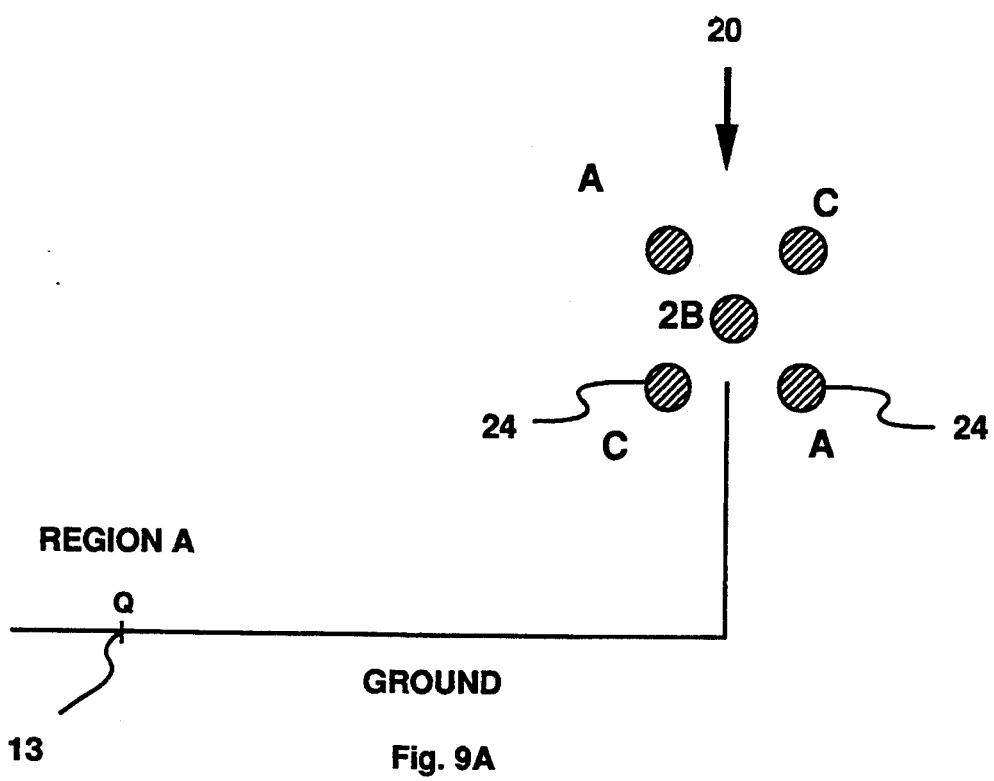
FIG. 9A illustrates a schematic cross-sectional view of the conductors of the transmission line of FIG. 3 relative to a remote location Q.
Figure 9B:
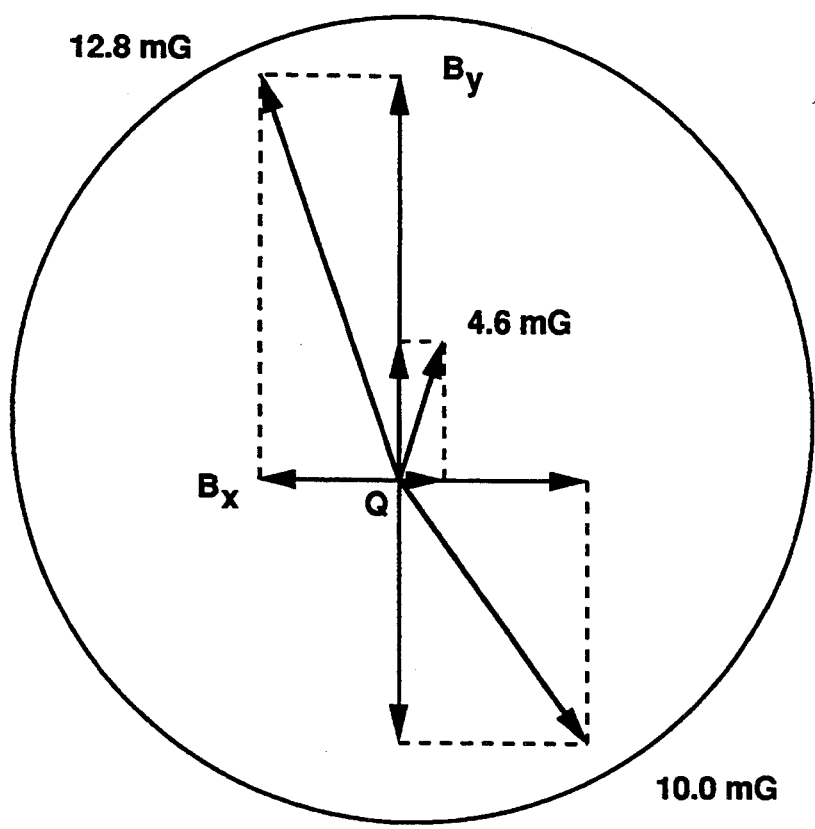
Figure 10:
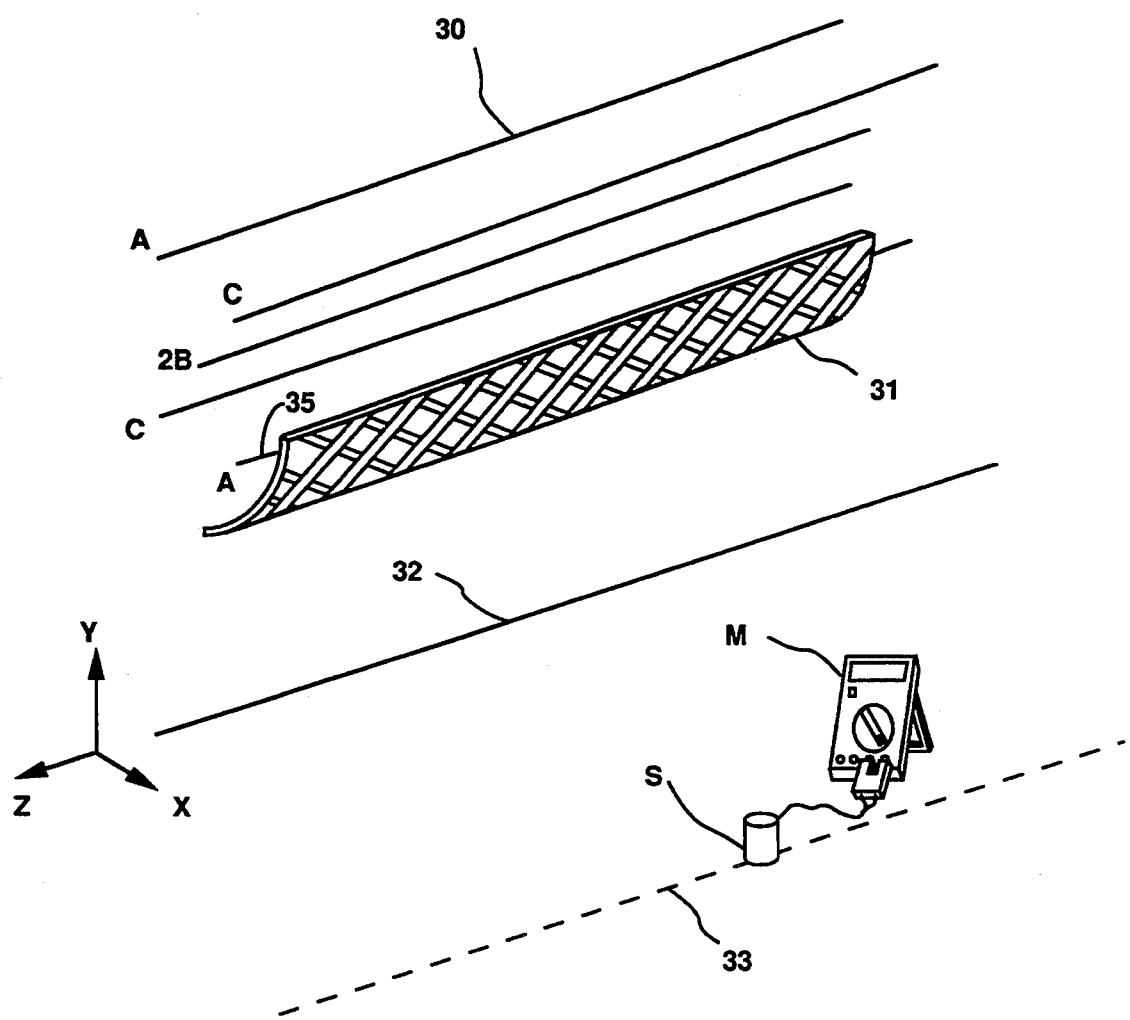
Figure 11:
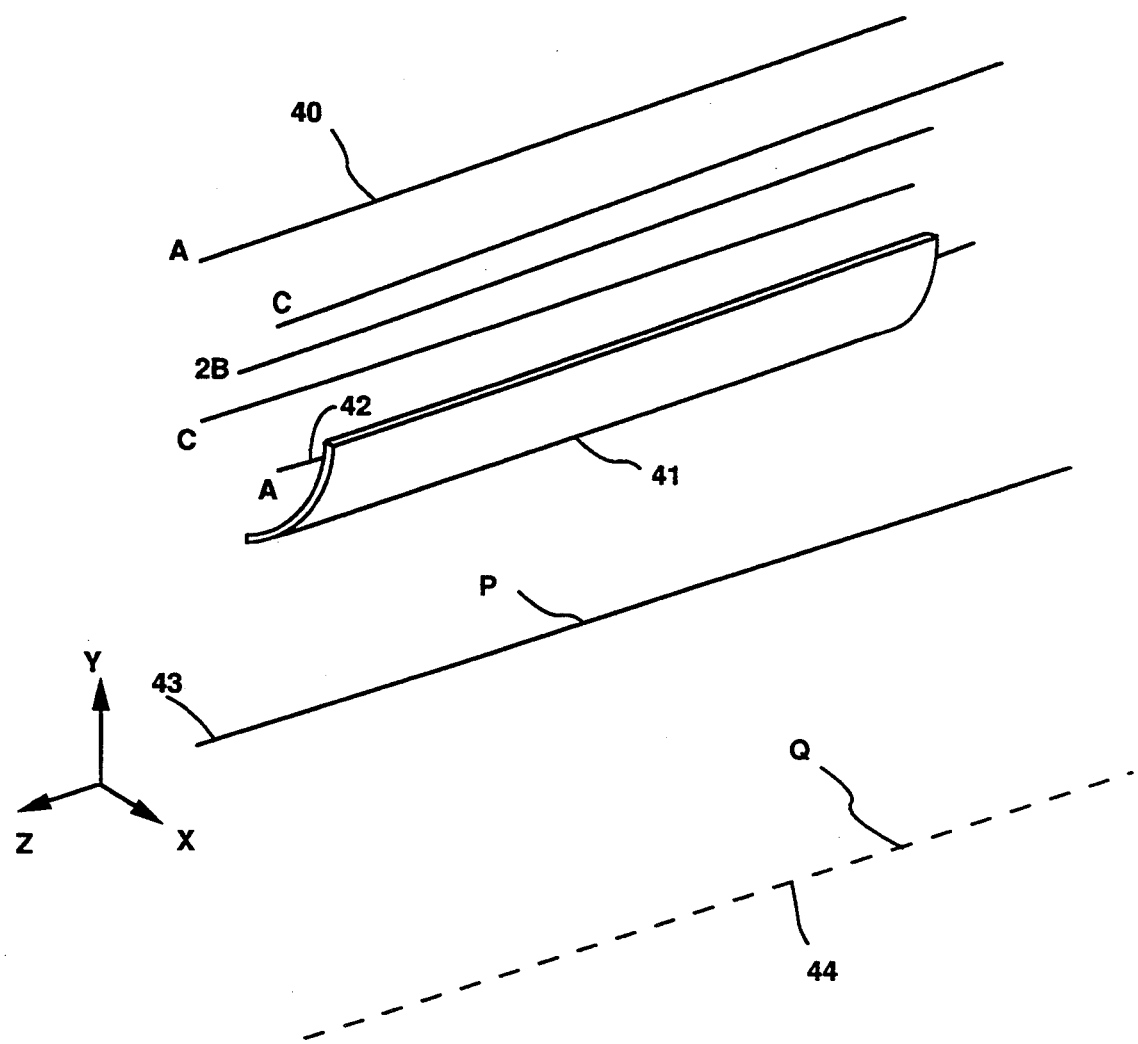
Figure 12:
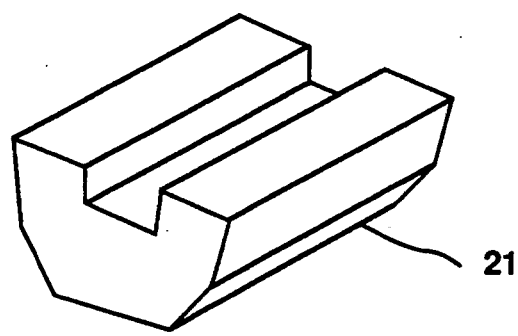
Figure 13A:
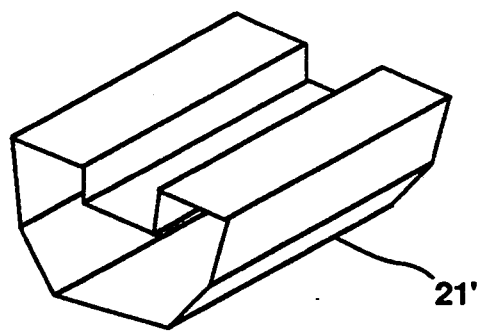
Figure 13B:
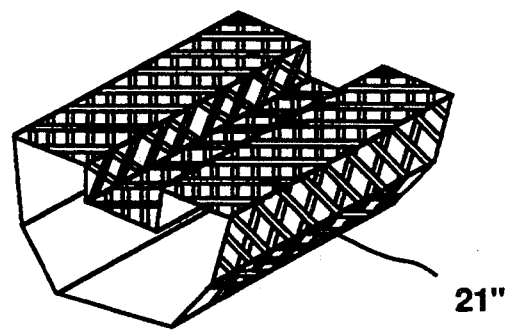
Figure 14:
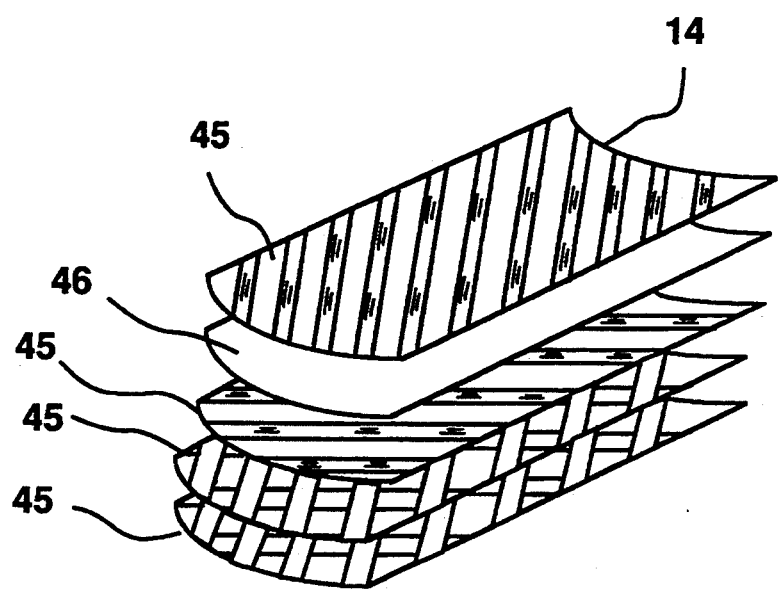
Figure 15:
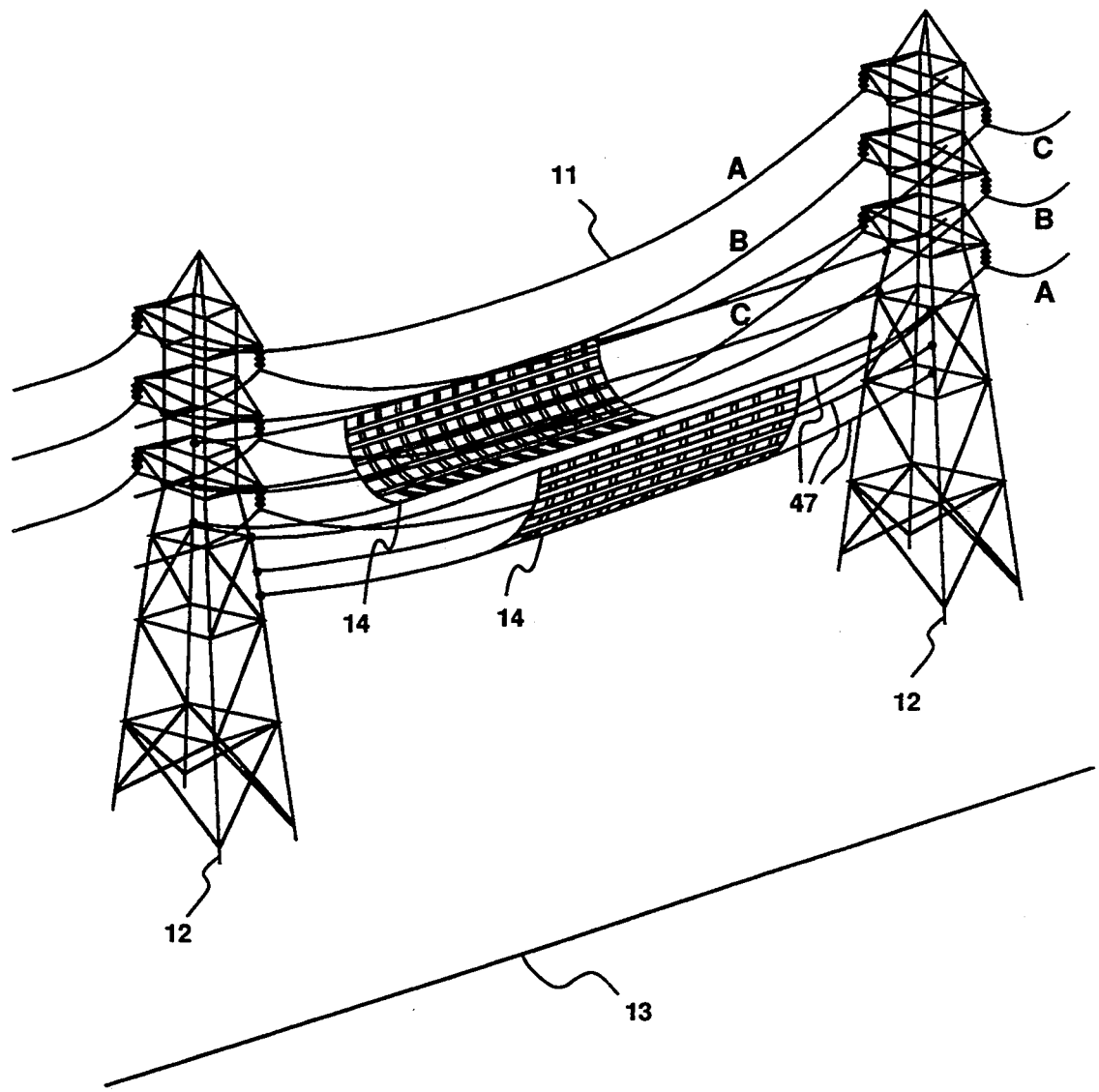
Figure 16A:
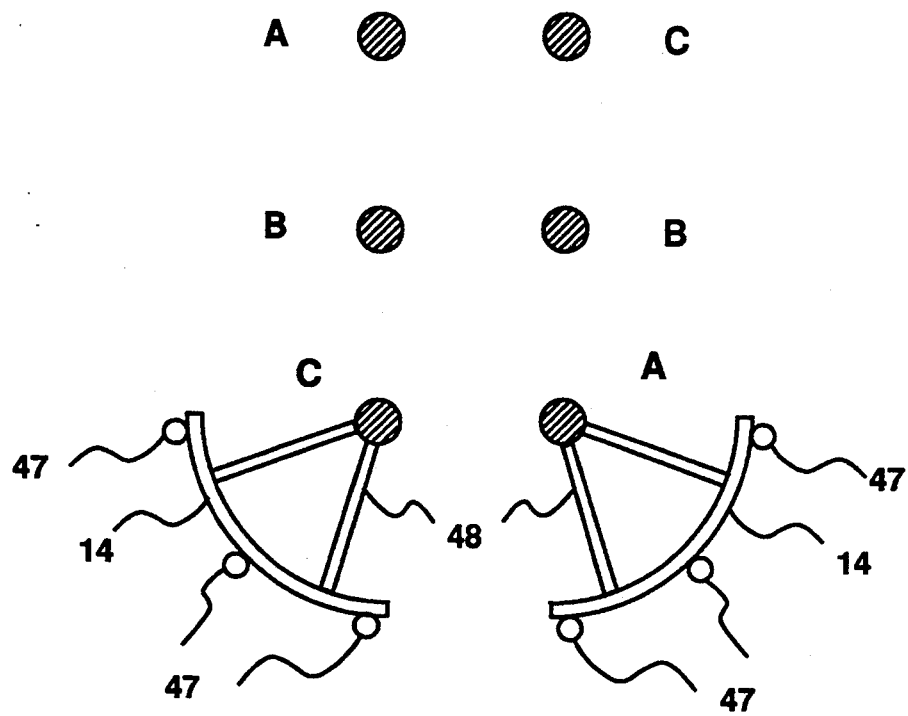
Figure 16B:
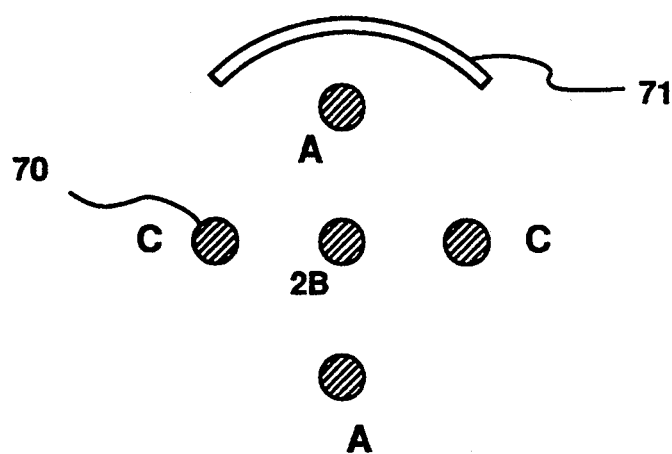

FIG. 9B graphically illustrates the magnetic field mitigation at location Q;

FIG. 10 illustrates an arrangement for an experimental analysis of the magnetic field pattern of the electric power transmission configuration of FIG. 3 in accordance with the invention;

FIG. 11 illustrates an arrangement for a numerical simulation of the electric power transmission system of FIG. 3 in accordance with the invention;

FIG. 12 illustrates an enlarged cross sectional view of a U-shaped solid mitigating body;

FIG. 13A illustrates an enlarged cross sectional view of a magnetic body constructed according to a hollow shape;

FIG. 13B illustrates an enlarged cross sectional view of a magnetic body constructed according to a hollow mesh shape;

FIG. 14 illustrates an enlarged cross sectional view of a magnetic body constructed according to multilayered mesh shape;

FIG. 15 illustrates a modified arrangement of magnetic bodies relative to the conductors of an electric power transmission system;

FIG. 16A illustrates a schematic cross-sectional view of the electric power transmission system of FIG. 15 in combination with an underground configuration of conductors with a mitigating body in accordance with the invention;

FIG. 16B illustrates a schematic cross-sectional view of an underground configuration of conductors with a mitigating body in accordance with the invention.

Figure 1:
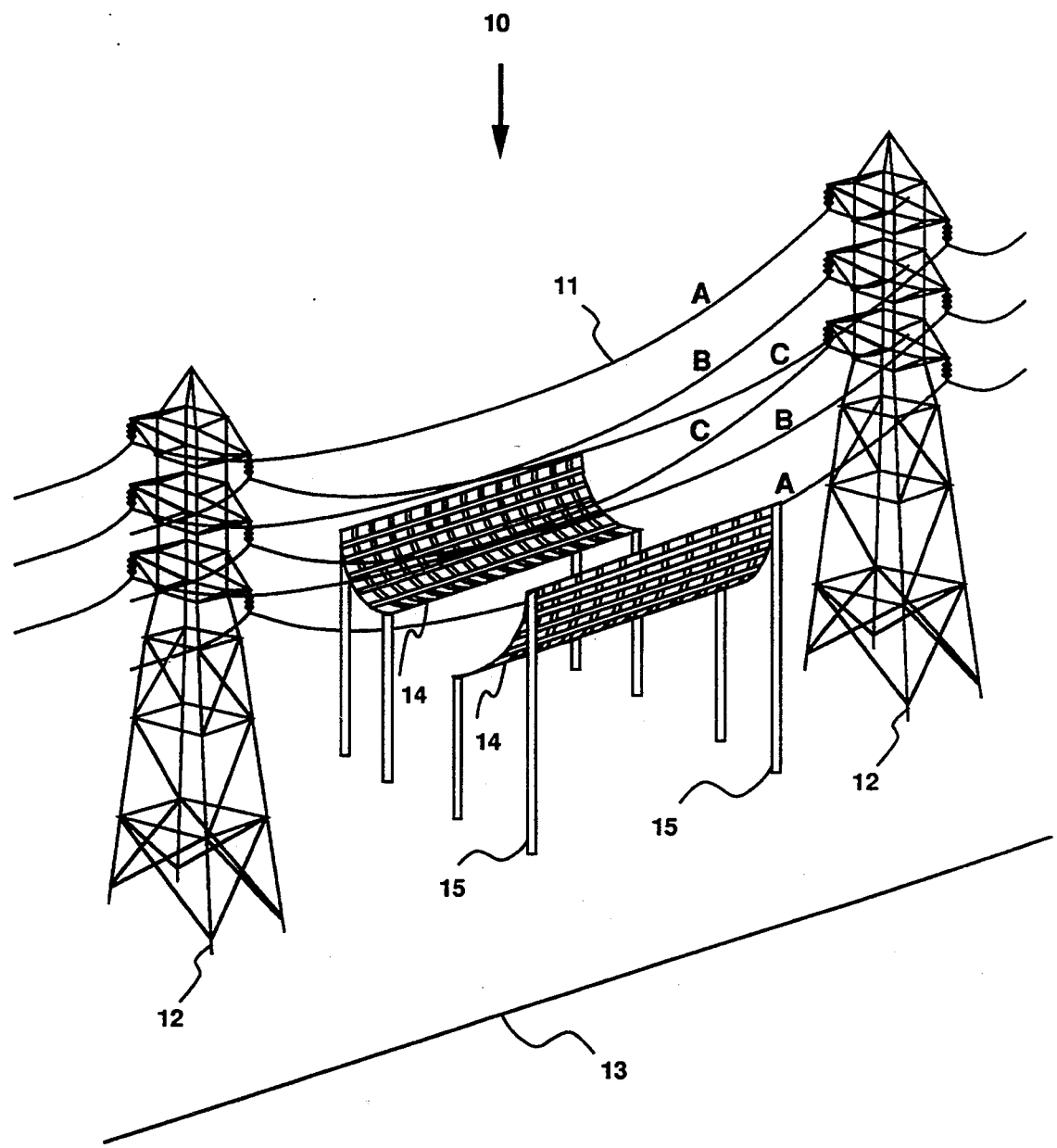

Referring to FIG. 1, the electric power transmission system 10 includes a plurality of co-extensive conductors 11 for conducting electrical current and a plurality of towers 12 for supporting the conductors 11 in a predetermined array relative to each other and in an elevated position along and above a predetermined right-of-way 13. A magnetic body 14 is placed adjacent to the transmission line employing a solid support structure 15. A cross-sectional view of the electric power transmission system 10, the mitigating magnetic body 14, and support structure 15 are shown in FIG. 2.

Figure 2:
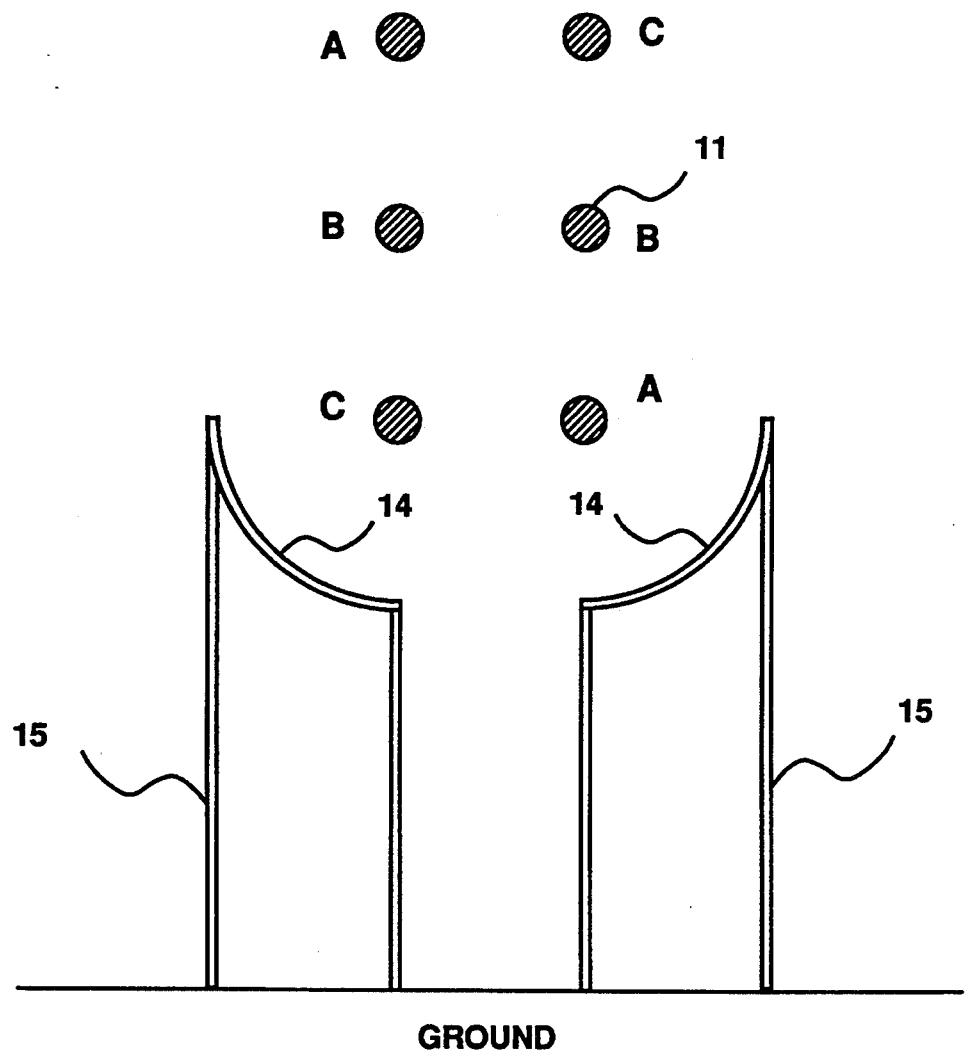
FIG. 2 illustrates a cross sectional view of an array of the transmission line of FIG. 1 together with two mitigating bodies.

The conductors are disposed in a ABC-CBA array, i.e. a low-reactance configuration, as indicated in FIGS. 1 and 2, and each conductor acts as a magnetic field source. Alternatively, the conductors 11 may be disposed in other suitable arrays, for example, as shown in FIG. 3, five electric power transmission conductors 20 are disposed in an X-configuration, with the cross-sectional view 23—23' shown in FIG. 4. The conductors may also be deployed in any horizontal or vertical configuration including various delta and superbundle configurations, as are well known.

Figure 5:
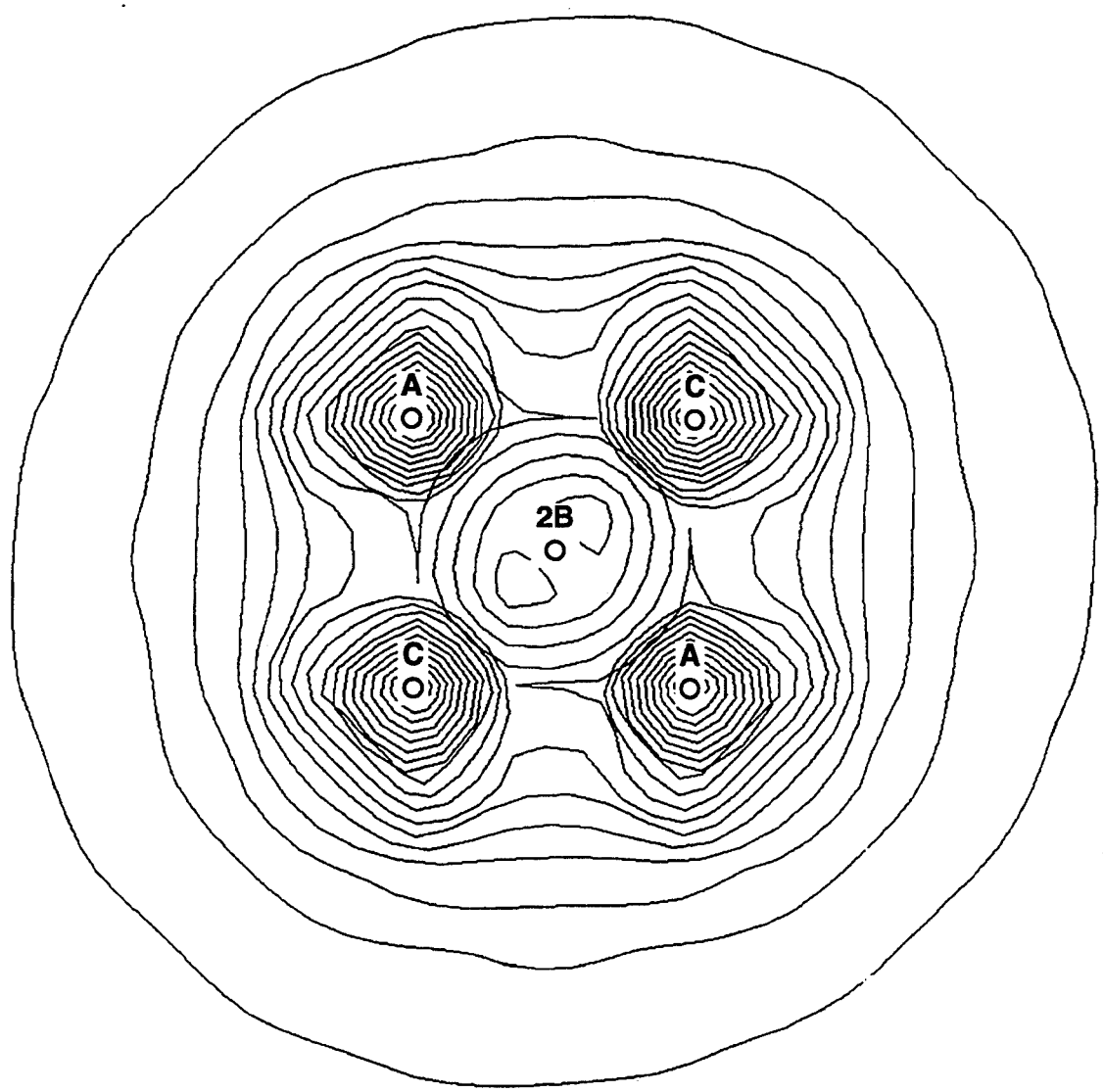
FIG. 5 illustrates a magnetic field pattern of isomagnitude contours produced by the electric power line of FIG. 3 in the absence of the mitigating bodies at the time value which corresponds to the maximum magnetic field magnitude at the right-of-way.
Figure 6:
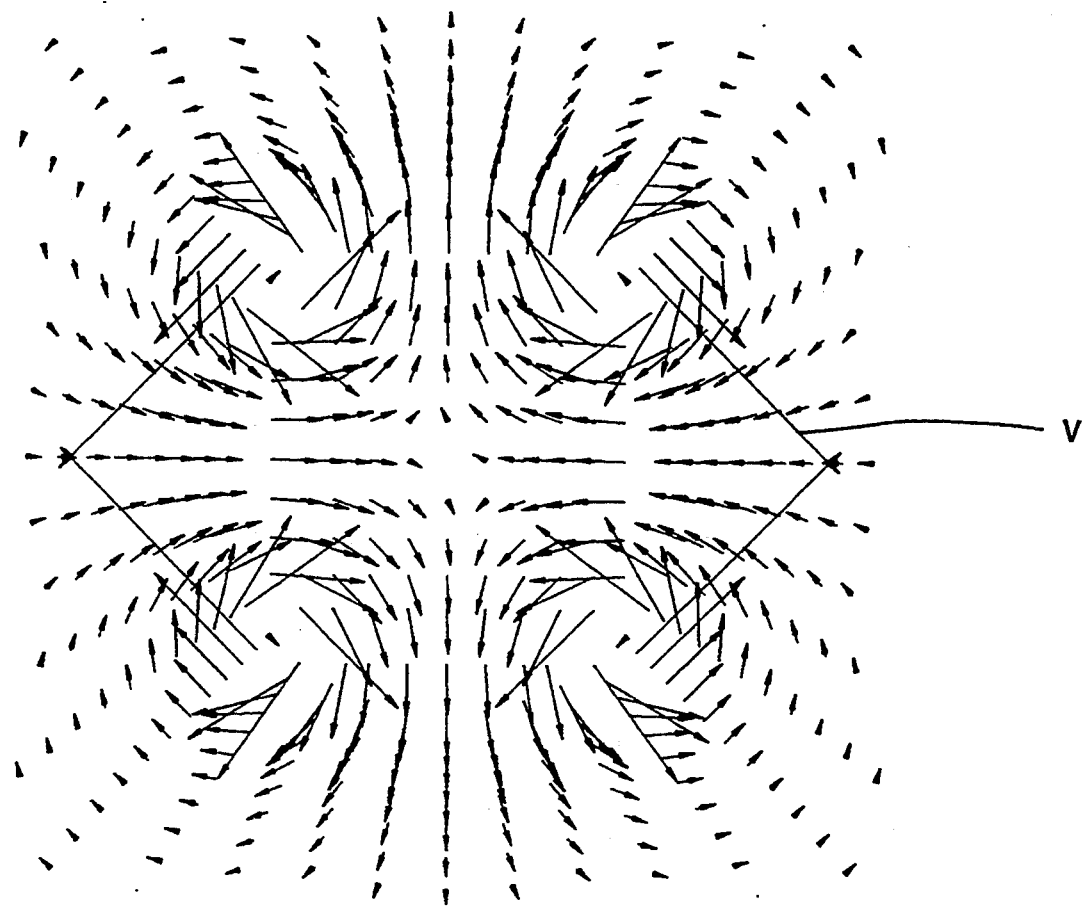
FIG. 6 illustrates a magnetic field plot of the electric power line of FIG. 3 under the same conditions of FIG. 5.

The current in each of the phases of the three phase AC circuit varies sinusoidally as a function of time. Accordingly, the magnetic field generated in each power line conductor varies in both magnitude and direction. Also, the composite magnetic field generated by all the conductors at a given location reaches a maximum at a certain instant in time. A typical composite magnetic field contour for the electric power conductors 20 of FIG. 3 is illustrated in FIGS. 5 and 6 at the time at which the magnetic field magnitude becomes maximum at the right-of-way.

Referring to FIG. 3, in order to mitigate the magnetic field at a remote point, for example, a building adjacent to the right-of-way 13, a body of ferromagnetic material is positioned adjacent the power line 20 and remote from the building. The body 21 is of U-shaped cross-section and is located between the lowermost line 24 and the right-of-way 13 in an inclined plane common to the line 24 and the point in the right-of-way. In addition, the body 21 is located adjacent to this lowermost line 24, for example at a distance of not more than two meters from the lowermost line 24 and with a pair of legs 25. The body is of a length which is coextensive with the power line 20 and, for example, is suspended from the lowermost conductor 24.

By way of example, in the configuration of FIG. 3, the conductors carry 60 Hz AC peak current of 1000 Amperes except for the middle conductor which carries 2000 Amperes. This figure may be taken to depict a split phase transmission line, which is infinitely continuous in its axial direction. The phases A, B, and C are 120 degrees out of phase from each other. The time dependance of the currents are assumed as follows:

$$IA = 1000 \sin(\omega t + 120°)$$

$$IB = 1000 \sin(\omega t)$$

$$IC = 1000 \sin(\omega t + 240°)$$

Thus, this source produces a time-dependent magnetic field. FIG. 5 shows the isomagnitude contour lines generated by the X-configuration of FIG. 3 at time $t = 1.16 \times 10^{-4}$ second which yields the maximum field magnitude at the edge of the right-of-way. FIG. 6 shows the magnetic field vectors V generated by the conductors arranged in an X configuration at the same time, $t = 1.16 \times 10^{-4}$s. Here, the length of the arrows is proportional to the magnitude of the magnetic field vector and the direction represents the direction of the magnetic field vector. This is the magnetic field generated by the source alone.

Figure 4:
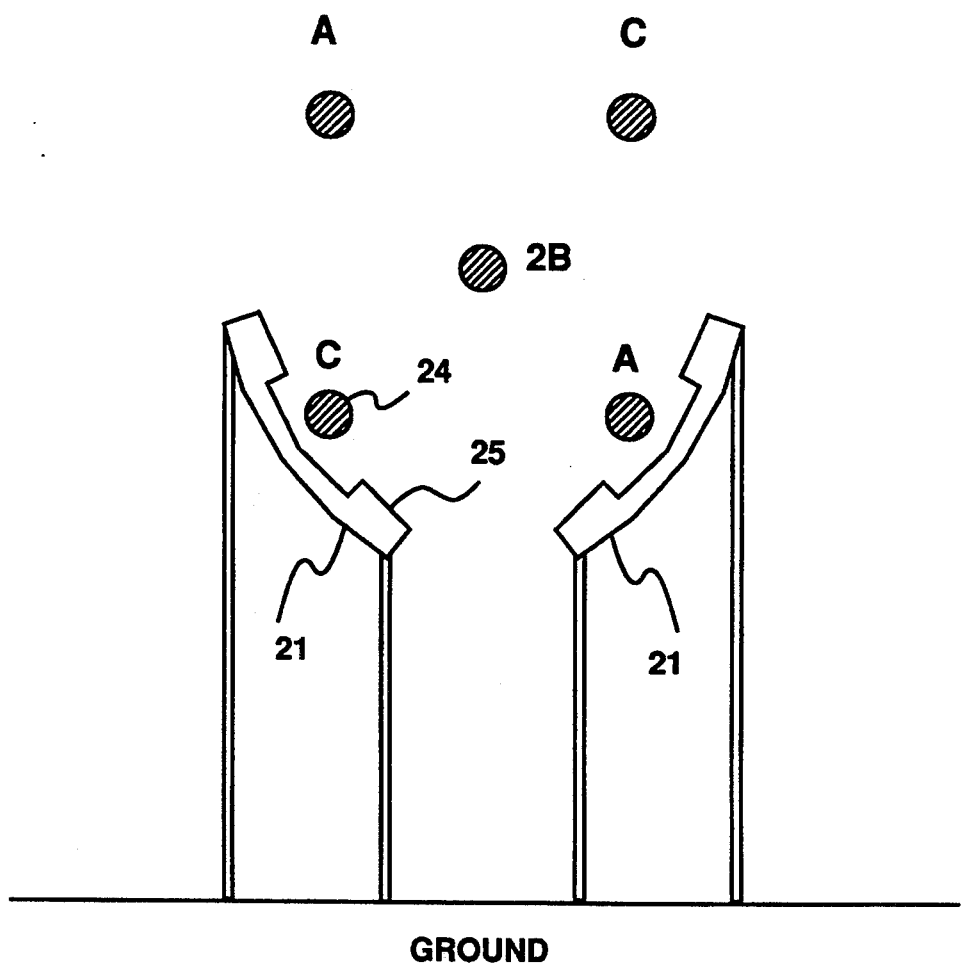
FIG. 4 illustrates both a cross-sectional view of the electric transmission line in FIG. 3 and also an enlargement of one of the mitigating magnetic bodies.

Next, two magnetic solid bodies 21 of FIGS. 3 and 4 each of length 7.14 meters and height 1.55 meters are placed adjacent to two of the five current-carrying wires, as shown in FIG. 4. The magnetic bodies are assumed to be infinitely continuous along the direction of the wires for the purposes of the simulation. The ferromagnetic bodies 21 are placed below the two lower conductors at an angle of inclination of 45 degrees. These ferromagnetic bodies 21 will be referred to as U-shaped. The magnetic U shaped bodies 21 are 0.75 meters away from the conductors 24 and have a relative magnetic permeability of 100. Due to the magnetic field generated by the currents in the conductors 24, these magnetic bodies 21 become magnetized and, in turn, generate the magnetic field vectors shown in FIG. 7 (again at the same reference time value, $t = 1.16 \times 1-^{-4}$s.)

Figure 7:
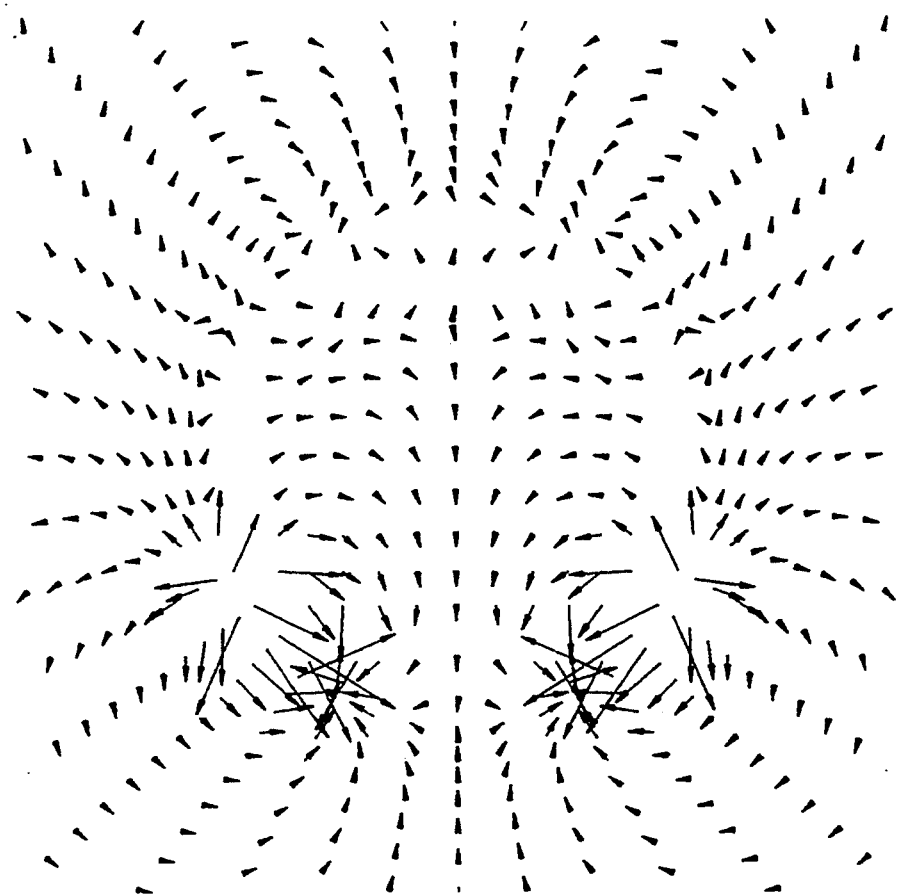
FIG. 7 illustrates a magnetic field pattern produced by two mitigating bodies of FIG. 4 in accordance with the invention under the same conditions of FIG. 5.
Figure 8:
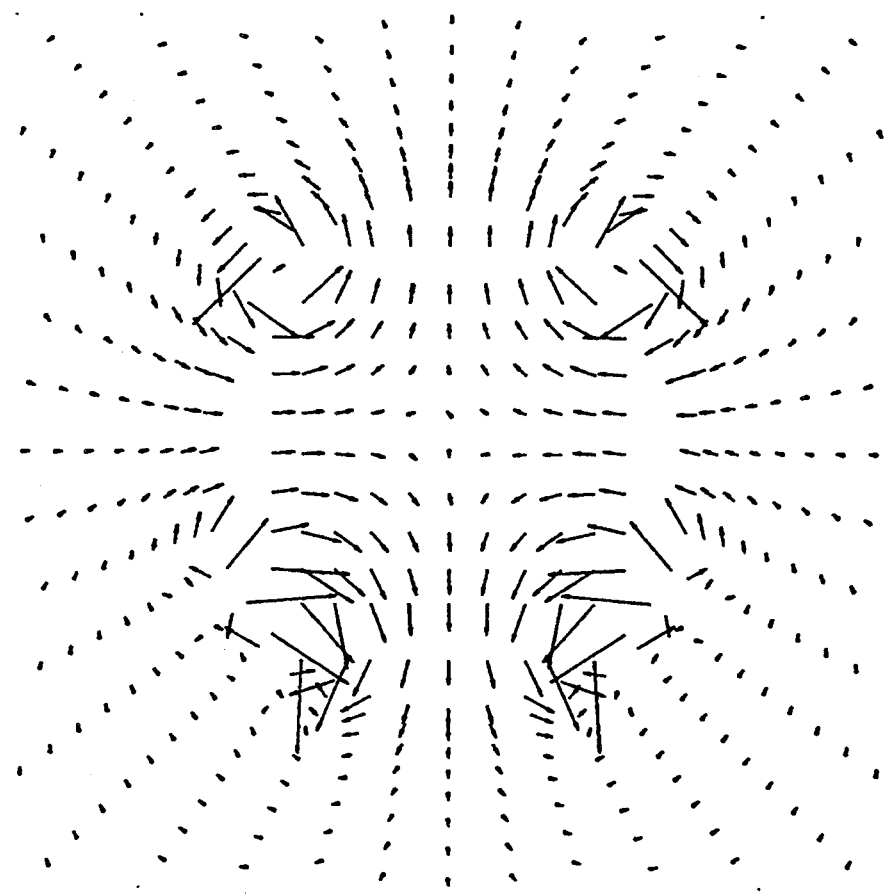
FIG. 8 illustrates a magnetic field pattern of the electric power line of FIG. 3 as altered by the magnetic bodies under the same conditions of FIG. 5.

FIG. 8 shows the magnetic field vectors obtained upon the vector superposition of the magnetic fields associated with the source 20 (FIG. 6) and the magnetic U-shaped bodies 21 (FIG. 7). In various regions of the space surrounding the conductors and the U-shaped magnetic body, one observes alterations in the original field associated with the source. Specifically, one observes significant reductions in the magnetic field magnitude as observed for Region A, indicated in FIG. 9. Here, at a selected location Q remote from the source (FIG. 9), the magnitude of the magnetic field of the source 20, which is 12.8 mG in the absence of the magnetic bodies 21, is reduced to 4.6 mG by the introduction of the U-shaped magnetic bodies, giving rise to a 63% reduction in the magnitude of the magnetic field at a point Q.

PROCEDURE

The procedure of selecting a proper shape, size and physical properties for the magnetic body involves the study of the initial magnetic field plot cycle. The time location within the cycle which generates the maximum magnetic field magnitude at the area at which the field is to be mitigated is selected as the reference time. The magnetic field contour plots generated by the source at the reference time are then studied. The shape of the magnetic body is then taken to conform to the isomagnitude based magnetic field contours and the vector plots as shown in FIGS. 5 and 6, respectively. For maximum magnetization, usually the distance of separation between the magnetic body and the current bearing wire is minimized. Then, the numerical solution of Maxwell's equations are carried out to calculate the mitigation introduced by the magnetic body. The use of a computer allows the introduction of optimization routines, whereby the proper shape, size and physical properties of the magnetic body are selected to generate the targeted mitigation at the desired area.

The mitigation o the magnetic fields by placing magnetic bodies in the vicinity of the source will be illustrated further with two examples.

EXAMPLE #1

Experimental Analysis of a Source Carrying Low AC Currents in Presence of a Hollow Mesh Based Magnetic Body Referring to FIG. 10, in an experimental setup, conductors 30 are arranged in an X-configuration as described earlier in FIG. 3. Here, the conductors 30 are ten centimeters apart and carry an AC peak current of five amperes, flowing along the z-axis with phases A,B, and C which are 120 degrees out of phase from each other. The lowest conductor 35 is placed at 14 centimeters from the plane where the magnetic field measurements are made. A sensor S to measure the magnetic field is located at thirty centimeters from the centerline of the conductors 30 and is connected to a suitable readout meter M. This arrangement of conductors generates 0.3 mG and 10.4 mG magnetic field components in x and y directions, respectively. The magnetic field magnitude of 10.4 mG is obtained by the square root of the sum of squares of the components.

A ferromagnetic body 31 of inner radius thirteen centimeters and of arc length of a quarter of a circle is constructed as shown in FIG. 10. This arc shaped body has a double layer mesh of soft magnetic material (METGLAS-2705M). The mesh elements are one inch wide strips of METGLAS and are inclined at forty five degrees to the conductors. The gaps between the adjacent strips are also one inch wide. The ferromagnetic material is 0.002 centimeters thick and has a relative magnetic permeability of 100,000-300,000. Placing this ferromagnetic body 31 adjacent to the lowermost conductor 35, as in FIG. 10, generates magnetic field components of 0.3 mG and 2.1 mG in the x and y directions, respectively. Thus, a magnetic field magnitude of 2.1 mG is observed at thirty centimeters from the centerline of the circuit 32. Hence, at the same location, the magnetic field magnitude is reduced 80% from 10.4 mG to 2.1 mG due to the presence of the ferromagnetic mesh 31. It should be noted that the ferromagnetic body is placed as close as possible to the alternating current source, i.e. touching one of the conductors or very close to the conductor 35 to give rise to a sizable reduction at a far away location 33, i.e. at about twenty six centimeters away from the lowest conductor diagonally. The reduction of the magnetic field due to the presence of the magnetic mesh 31 prevails over large areas. This experiment thus demonstrates that placing a magnetic body close to source can mitigate the magnetic field away from the source.

EXAMPLE #2

Numerical Simulation of 1000 Amperes AC Current Carrying Source in the Presence of a Solid Magnetic Body Referring to FIG. 11, an AC source consisting of five conductors 40 again in the X-configuration is considered. Here, the conductors carry an AC peak current of 1000 amperes and are radially ten meters apart from each other. This example can again be taken to depict an electric power transmission or distribution line. A magnetic solid arc shaped body 41 of inner radius 10.7 meters and thickness 0.8 meters is placed at a distance of 0.75 meters from the lower conductor 42 as shown in FIG. 11. The current carrying conductors 40 and the magnetic body 41 extend to infinity along the z-direction. Thus, there is no variation of the magnetic field in the z-direction. The numerical solution of Maxwell's equations is accomplished using the Finite Element Method in conjunction with the concept of magnetic scalar potential. First, the magnetic field produced by the current carrying source is estimated in the region surrounding the conductors. For illustration, two locations P 43 and Q 44 are selected as shown in FIG. 11. The magnetic fields produced by the source are time dependent and are 69.4 mG and 12.8 mG at time $t = 1.16 \times 10^{-4}$s.

Placing the solid arc shaped magnetic body 41 immediately in the vicinity of the conductors 42 as shown in FIG. 11 distorts the magnetic field in the entire surrounding region of the source. The magnetic body is assumed to have a relative magnetic permeability of 100. The presence of the magnetic body reduces the magnetic field magnitudes of 20.6 mG and 2.1 mG at locations P and Q, respectively. Thus, placing the magnetic body at such a small distance of separation of 0.75 meters away from the lowermost conductor 42 creates a 70% reduction at P 43 and a 841% reduction at location Q 44.

This numerical simulation again shows that the alteration of the magnetic fields far away from the source is possible by placing a magnetic body in the immediate vicinity of the source.

The mitigating magnetic body 14 may be of any particular shape suited to the needs of the objects within or adjacent to a right-of-way to be protected. For example, as indicated in FIG. 12, the U-shaped body 21 may be made of solid material. Alternatively, the U-shaped body 21 may be hollow 21' as shown in FIG. 13A or may be of a hollow mesh 21" structure, as shown in FIG. 13B.

The body 14 may be made from a folded over construction of arc shape with strips of magnetic material disposed in spaced-apart relation and in folded-over relation from one layer to the next layer as shown in FIG. 14. Multiple mesh layers may also be used to construct a magnetic body. For example, the body may have upper and lower layers 45 which may each consist of narrow strips of ferromagnetic material with the upper layers separated by a layer of electrical insulation 46.

Referring to FIGS. 15 and 16A, wherein like reference characters indicate like parts as above, each magnetic body 14 may be mounted in a manner so as to be suspended from the towers which support the conductors. To this end, additional support wires 47 may be strung between the towers so as to support the magnetic bodies in position adjacent to the transmission lines. As indicated in FIG. 16, insulated spacers 48 may be connected to and between the lowermost conductor respective body so as to maintain the magnetic body in spaced relation to the conductor. Any suitable type of rigid structure may be used for this purpose. The method and apparati outlined here may also be utilized to mitigate the magnetic fields generated by other types of electric power transmission and distribution lines, which can also be located underground.

As indicated in FIG. 16B, conductors 70 may be buried underground. Alternatively, the conductors may be deployed in combinations of underground and above ground configurations. As illustrated, a body 71 of magnetic material may also be deployed in a manner as described above to alter the pattern of a magnetic field generated by the underground conductors 70.

The invention may also be used to mitigate the magnetic field generated by sources found in other structures, for example, transformers, appliances hair dryers or computers. In cases where the source of the magnetic field is found within a housing such as a building for a transformer, a hair dryer or a computer housing, a body of magnetic material can be placed within the housing close to the source of the magnetic field in order to mitigate the field in a particular direction or at a particular point outside the housing. As a corollary to this, the magnetic body can be used to enhance the magnetic field at another point within or outside the housing where such may be desired or required.

The magnetic body may consist of various materials, including pultruded strips of soft magnetic materials, strips or assemblies of such magnetic materials, extruded profiles or molded bodies of magnetic composites consisting of soft magnetic fillers and conductive binders and matrices.

The invention thus provides a relatively simple system for the mitigation of the magnetic field. In particular, the invention provides a body which can be located near the source of a magnetic field in order to shield an object or location spaced at a relatively great distance from the source and the mitigating magnetic body. For example, magnetic bodies of proper size, shape and physical properties may be employed along the length of the electric power conductors strung between the towers in order to shield a right-of-way located at a substantial distance away from the conductors.

What is claimed is:

1. A method for mitigation of a magnetic field from a magnetic field generating source comprising the steps of determining the pattern of a magnetic field generated about a magnetic field generating source; and positioning a body of magnetic material adjacent to said source in a predetermined area of said magnetic field pattern to alter said pattern in order to reduce the magnitude of said pattern at an area remote from said source and said body.

2. A method as set forth in claim 1 wherein the step of determining the magnetic field pattern is performed experimentally during operation of said source.

3. A method as set forth in claim 1 wherein the step of determining the magnetic field pattern is performed using Maxwell's equations.

4. In combination, a magnetic field generating source for generating a magnetic field about said source; and a body of magnetic material adjacent to said source and disposed between said source and a predetermined point spaced from said source to intercept said magnetic field relative to said point to an extent to reduce the magnitude of said magnetic field at said point.

5. The combination as set forth in claim 4 wherein said source is a plurality of coextensive electric power transmission conductors.

6. The combination as set forth in claim 5 which further comprises at least two towers supporting said conductors in an elevated position above said predetermined point.

7. In combination, an electric power transmission system including at least two electrically conductive conductors for conducting electrical current with a corresponding magnetic field being produced transversely of each said conductor to form a composite magnetic field and at lest two towers supporting said conductors in an elevated position along and above a predetermined right-of-way; and at least one body of magnetic material disposed adjacent to one of said conductors said body being disposed between said one conductor and said right-of-way to intercept and distort said composite magnetic field of said conductors relative to said right-of-way to an extent which reduces the magnitude of said composite magnetic field to and beyond said right-of-way.

8. The combination as set forth in claim 7 wherein said body has a U-shaped cross-section with a pair of legs.

9. The combination as set forth in claim 7 wherein said body has an arc shaped cross-section.

10. The combination as set forth in claim 7 wherein said conductors are disposed in an X-configuration.

11. The combination as set forth in claim 10 wherein said body is disposed adjacent a lowermost one of said conductors.

12. The combination as set forth in claim 11 wherein said body is disposed from said lowermost conductor at a distance of less than two meters.

13. The combination as set forth in claim 7 wherein said body is effective over a range larger than the length of said magnetic body.

14. The combination as set forth in claim 7 wherein said body is made of strips of soft magnetic materials.

15. The combination as set forth in claim 7 wherein said body is made of strips of soft magnetic materials shaped into a mesh.

16. The combination as set forth in claim 7 wherein said body is made of extruded strips of soft magnetic materials shaped into a mesh.

17. The combination as set forth in claim 5 wherein at least some of said conductors are disposed underground.

18. The combination as set forth in claim 5 wherein some of said conductors are disposed underground and some of said conductors are disposed above ground.

19. The combination as set forth in claim 7 wherein said conductors are disposed in a delta configuration.

20. The combination as set forth in claim 7 wherein said conductors are disposed in a superbundle configuration.

21. A method for mitigation of a magnetic field from a magnetic field generating source comprising the steps of determining the magnitude of a magnetic field generated by a magnetic field generating source at a predetermined point remote from said source; and positioning a body of magnetic material adjacent to said source and in an area of the magnetic field generated by said source to alter the pattern of the magnetic field to reduce the magnitude of the magnetic field at said point remote from said source.

22. A method as set forth in claim 2 wherein the source of the magnetic field is a plurality of coextensive electric power transmission conductors and the body of magnetic material is placed adjacent a lowermost one of said conductors.

23. A method as set forth in claim 22 wherein the body of magnetic material is placed at a distance of less than two meters from said lowermost one of said conductors.

* * * * *